MAJOR DEFLECTION CIRCUITRY FOR CRT DISPLAY

Filed June 3, 1968 3 Sheets-Sheet 1

INVENTORS
MAURITZ L. GRANBERG
DAVID G. HANSON

BY Alfred E Hall
ATTORNEY

INVENTORS
MAURITZ L. GRANBERG
DAVID G. HANSON
BY Alfred E. Hall
ATTORNEY

MAJOR DEFLECTION CIRCUITRY FOR CRT DISPLAY

Filed June 3, 1968 3 Sheets-Sheet 3

INVENTORS
MAURITZ L. GRANBERG
DAVID G. HANSON

BY Alfred E. Hall
ATTORNEY

United States Patent Office 3,489,946
Patented Jan. 13, 1970

3,489,946
MAJOR DEFLECTION CIRCUITRY FOR CRT DISPLAY

Mauritz L. Granberg and David G. Hanson, Minneapolis, Minn., assignors to Sperry Rand Corporation, New York, N.Y., a corporation of Delaware Filed June 3, 1968, Ser. No. 733,857
Int. Cl. H01j 29/70
U.S. Cl. 315—18 10 Claims

ABSTRACT OF THE DISCLOSURE

Major beam deflection circuitry for a CRT display utilizing both large and small counts to permit constant beam traverse through the center region of the screen for vector display purposes. The large counts are obtained by a first deflection circuit coupled to the deflection coils which cause the beam to assume any one of a number of spaced location on the CRT screen. The small counts are obtained by a second deflection circuit coupled to the deflection coils which cause the beam to assume predetermined locations in between the spaced locations caused by the large counts. Thus, the CRT can draw a vector through the center of the screen without blanking the beam to switch the current through the yokes since the circuit producing the small counts can carry the beam through the center of the screen while the circuit producing the large counts is being switched from one yoke to the other.

Background of the invention

The present invention relates to beam deflection circuitry which enables an alphanumeric display system having a single-ended major deflection circuit and either a single-ended or a push-pull minor deflection circuit to draw vectors without having to blank the beam when going through the center of the display.

In prior art display systems, push-pull deflection circuits have been used for gross beam positioning in order to obtain good circuit linearity. These circuits include a register which stores the digital position of the beam and each stage of the register has both a CLEAR and a SET output. The CLEAR side of each of the stages drives one set of digital-to-analog (D/A) converters while the SET side of each stage drives a complementary set of D/A converters. Each D/A converter may include a metering resistor with all of the metering resistors of one set of D/A converters connected in parallel to drive one-half of the push-pull yoke system. For purposes of this discussion, a so-called push-pull yoke system is one in which the electron beam deflection along the horizontal or vertical axis depends on the non-zero current in both the true and complementary windings of the yoke over the entire axis except at the extreme end points, in which case there is maximum current in one winding and substantially zero current in the other winding. At the center point of the axis, the currents in the true and complementary yoke windings are each substantially equal to one-half the maximum current levels at the edges of the CRT screen. This type of circuit operation is often referred to as class A push-pull operation. With this system, there is no requirement for the beam to be blanked or yokes switched in the center of the display screen. The disadvantage of this type system is that it has increased power requirements as well as requiring an increased amount of hardware in the D/A converter circuits.

By using single-ended deflection circuits, the above disadvantages of the push-pull circuit can be eliminated. The term "single-ended" as applied to deflection circuits herein, is intended to include the circuit arrangement wherein the electron beam deflection along the horizontal or vertical axis depends on current through single yoke coils respectively, with zero current defining one edge and maximum current defining the opposite edge. In order to limit current levels, a modification of the deflection circuit arrangements for the horizontal and vertical yoke coils is made by splitting each of the yoke coils into true and complementary windings. This gives rise to operation wherein current in the true yoke winding for an axis deflects the electron beam one-half the distance across the screen, while zero current flows in the complementary yoke winding; and current in the complementary yoke winding deflects the electron beam over the remaining one-half of the axis width, while zero current flows in the true yoke winding. It is referred to as single-ended in that current is always applied to only one end of the yoke for a given axis irrespective of whether it is split or not, whereas in the push-pull system currents are always applied to both ends of the yoke winding, except at extreme edge positions, as described above. The same amount of circuitry to move the beam to one side of the screen from the center can be used to move the beam to the other side of the screen from the center. However, when the beam reaches the center of the screen, the beam has to be blanked while the D/A converter outputs are switched from one yoke to the other. This is a significant problem in vector generating machines since the drawing or "painting" of the vector must be stopped in the center of the screen in order to blank the beam and give the deflection circuits time to switch.

Commonly assigned copending application Ser. No. 576,276 filed Aug. 31, 1966, now United States Patent 3,417,284, is directed to an electromagnetic gross beam positioning system which has an improved single-ended deflection circuit. This circuit includes a bias resistor in the D/A converter circuit which causes a predetermined amount of current to flow through whichever yoke is activated. This current has such a value that the beam is positioned ½ step off center on either the left or right side considering only the X-axis. Thus, when the beam has stepped, for example, from the extreme left side of the screen, with the D/A circuits all conducting, to a point as near the center as possible, with the D/A circuits all nonconducting, the bias resistor still maintains the beam ½ step off center to the left. When the D/A circuits are switched and connected to the other yoke, the bias resistor current is also switched to the other yoke and the beam moves ½ step off center to the right. Thus, there is no "0" position and the beam moves continually through the center position. However, while the circuit improves over the prior art single-ended deflection systems, it has the disadvantage of causing uncertainty in the position of the beam at the ½ step positions because the bias current through the yokes has to be switched and, even though it is a small current, it has to be given time to settle down. If the beam is not blanked at this time, small errors in beam position may result.

Summary of the invention

The present invention is an improvement over the above identified commonly assigned copending application as well as an improvement over other prior art single-ended deflection circuits.

The system includes first and second deflection yokes being alternately driven as a single-ended system by a first deflection circuit which produces what may be termed "large counts" which position the beam at major locations on the screen and a second deflection circuit which drives the first and second yokes either in a push-pull relationship or alternately as a single-ended system. The second deflection circuit produces what may be termed "small counts" which position the beam at minor locations between the major locations on the screen.

Thus, when all flip-flops of the beam position input storage register are CLEARED or are receiving, for example, "0" inputs, both the first and second deflection circuits are producing maximum counts, both large and small, and the beam is positioned, for example, at the extreme left edge of the display screen. One-by-one the flip-flops are sequentially SET and the second deflection circuit removes the small counts one-by-one until a large count is reached. At that time a large count is removed and the small counts are restored and the beam continues to move toward the center of the screen step-by-step.

When all of the large counts have been removed and only the small counts remain, the particular operation that takes place depends upon whether the second deflection circuit, the one producing the small counts, is connected for single-ended or push-pull operation.

In general, when all of the large counts have been removed, the first deflection circuit contributes no current to the deflection yokes and the beam is moved under the influence of the second deflection circuit which produces the small counts only. This concept of having first and second deflection circuits producing large and small counts respectively enables the beam to be moved by the small counts through the center of the screen while the large counts are being switched from one yoke to the other.

Thus, it is a major object of this invention to provide a circuit which allows constant beam traverse through the center region of a cathode ray tube display screen for vector display purposes.

It is a further object of the present invention to provide deflection yokes being driven first and second deflection circuits with the first deflection circuit driving the yokes in a single-ended configuration and the second deflection circuit driving the yokes in either a push-pull or a single-ended configuration whereby the second deflection circuit can move the beam through the center region of the screen while the first deflection circuit is adjusting itself to switch current from one yoke to the other.

It is still another object of the present invention to provide a first deflection circuit which produces what may be termed "large counts" which position the beam at major locations on the screen and a second deflection circuit which produces what may be termed "small counts" which position the beam at minor locations between the major locations on the screen.

Brief description of the drawings

For a more complete understanding of the invention, these and other more detailed and specific objects will be disclosed in the course of the following specification, reference being had to the accompanying drawings, in which like numerals indicate like elements in the various figures of the drawings and in which.

Description of the preferred embodiments

Figure 1:
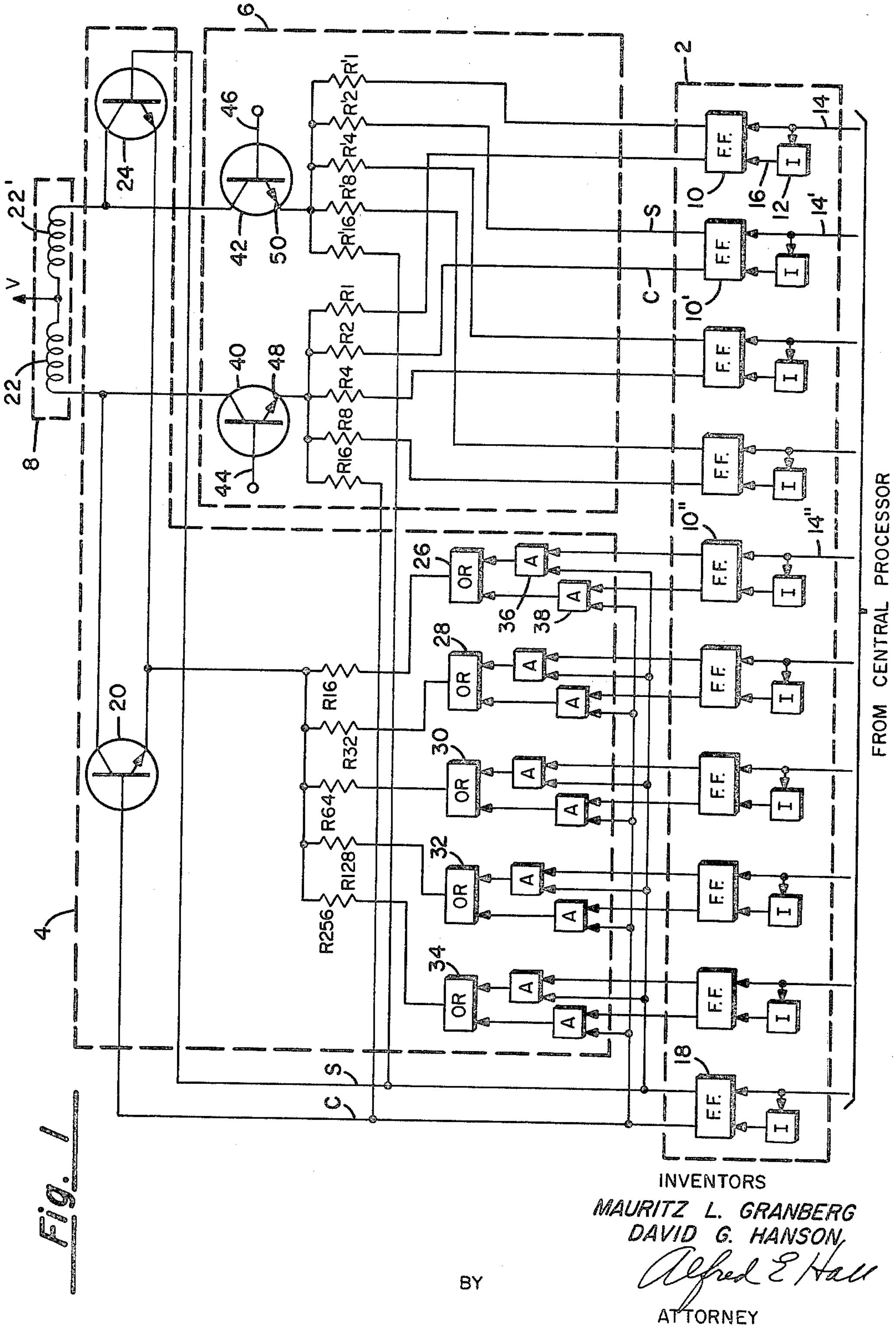
FIG. 1 is a circuit diagram of the novel invention wherein the second deflection circuit is of the push-pull type.

FIG. 1 is a circuit diagram of one embodiment of the present invention wherein the second deflection circuit is of the push-pull configuration. As can be seen the major components of the circuit include input register 2, a first or major deflection circuit 4, a second or minor deflection circuit 6 and deflection yokes 8. Only circuits for X-axis deflection are shown. Duplicate circuitry would exist for the Y-axis deflection.

Each stage of the input register 2 is of the self-clearing type and includes flip-flop 10 and inverter 12. Only one such stage is identified with these numerals for clarity of the drawings. However, all of the stages operate in like manner. For purposes of definition only, it will be assumed that when a flip-flop 10 is CLEAR, a "0" will be present on input line 14 which is coupled through inverter 12 on line 16 as a "1" and causes flip-flop 10 to produce an output on line C. In like manner, if a "1" is present on input line 14, inverter 12 has no effective output on line 16 and flip-flop 10 produces an output or a "1" on line S. It is to be understood that the above definitions are used as examples only in an arbitrary sense and a "1" or a "0" could be used interchangeably depending upon definition.

The last stage 18 of the input register 2 is used as a CONTROL stage which accomplishes two purposes. First, it determines the deflection yoke or coil to which the major deflection current should be coupled. That is, if flip-flop 18 is in the CLEAR state and producing an output signal on line C, transistor gate 20 in the major deflection circuit 4 is energized and couples the major deflection current through coil 22 of deflection yokes 8. Secondly, it adds either R16 to one side of the minor deflection circuit 6 or resistor R'16 to the other side of the minor deflection circuit 6. This is only necessary when the minor deflection circuit 6 utilizes push-pull circuitry as shown in FIG. 1. The reason will be explained in detail with relation to the operation of the entire circuit shown in FIG. 1.

Major deflection circuit 4 includes gating transistors 20 and 24, metering resistors R16, R32, R64, R128 and R256, OR gates 26–34 and AND gates 36 and 38 associated with each of the OR gates. Each of the AND gates 36 has as inputs the signals on line S of the associated flip-flop 10 as well as the signal on line S of the CONTROL stage 18. In like manner, each of the AND gates 38 has as inputs the signals on line C of the associated flip-flop 10 as well as the signal on line C of the CONTROL stage 18.

Minor deflection circuit 6 includes driver transistors 40 and 42 as well as metering resistors R1, R2, R4, R8 and R16 and metering resistors R'1, R'2, R'4, R'8 and R'16. Voltages are continuously applied to the bases 44 and 46 of driver transistors 40 and 42 respectively so that they are always prepared to conduct if a conducting path is enabled to one of the metering resistors connected to emitters 48 or 50 respectively.

Consider now the operation of the circuit shown in FIG. 1 as a whole. Assume initially that the input line 14 to each stage of the input register 2 has a "0" applied thereto. This means, as explained above, that each stage will be producing an output on line C. Thus, in the minor deflection circuit 6, metering resistors R1, R2, R4, R8 and R16 will be producing currents that are coupled through driver transistor 40 to coil 22 of deflection yokes 8. In the first or major deflection circuit 4, each AND gate 38 will provide a conducting path through OR gates 26–34 and metering resistors R16, R32, R64, R128 and R256 and gating transistor 20. Since the base of transistor 20 is coupled to the CONTROL stage 18 which is producing an output on line C, transistor 20 is conducting and causing current from its associated metering resistors to flow through coil 22 of deflection yokes 8. Thus, all of the current from both the first or major deflection circuit 4 and the second or minor deflection circuit 6 will be flowing through coil 22 of yoke 8, and the electron beam is positioned, for example, on the extreme left edge of the display screen of the cathode ray tube. As the various stages of the register 2 are SET to provide a sequential numerical count, i.e. 1, 2, 3, etc., the beam begins to move in sequential steps from the edge toward the center region of the screen. Thus, with a "1" present on line 14, flip-flop 10 produces a signal on line S and removes the signal from line C. This means that the current through resistor R1 is removed from driver transistor 40 and is coupled through resistors R'1 to driver transistor 42. The beam has then moved one step or increment toward the center region of the screen. Next, a "0" is applied to input line 14 and a "1" is applied to input line 14'. This represents a binary 10 or a decimal 2. This causes the current through resistor R1 to be restored but removes the current through resistor R2 to driver transistor 40 and couples it though resistor R'2 to driver transistor 42. Thus, the beam steps two increments toward the center region of the screen.

This process continues until the current through resistors R1, R2, R4, and R8 to driver transistor 40 has been removed and coupled through resistors R'1, R'2, R'4 and R'8 to driver transistor 42. At this time, the beam has moved 15 units or increments from the edge of the screen toward the center region.

The next count is a "1" on input line 14'' with a "0" present on all lower order lines. Thus, flip-flop 10'' produces an output signal on line S and removes the signal on line C. However, AND gate 36, which receives the signal on line S, cannot conduct since it does not receive an enable signal from CONTROL flip-flop 18. AND gate 38 which was enabled is now disabled with the signal removed from line C. Thus, the current through resistor R16 to gating transistor 20 in the first or major deflection circuit is removed. However, the current has been restored through resistors R1, R2, D4, and R8 in the minor deflection circuit because of the "0" present on all input lines of lower order than input line 14''. Thus, the beam has moved 16 steps or increments from the edge toward the center region of the screen.

This sequence continues until the current through all of the metering resistors in the major deflection circuit 4 has been removed. Current then flows only through metering resistors R1, R2, R4, R8 and R16 of the minor deflection circuit 6. At this time a "1" is present on all input lines 14 that are coupled to the major deflection circuit and a "0" is present on all input lines 14 that are coupled to the minor deflection circuit 6. Also, a "0" is present on input line 14 coupled to CONTROL stage 18.

Figure 2:
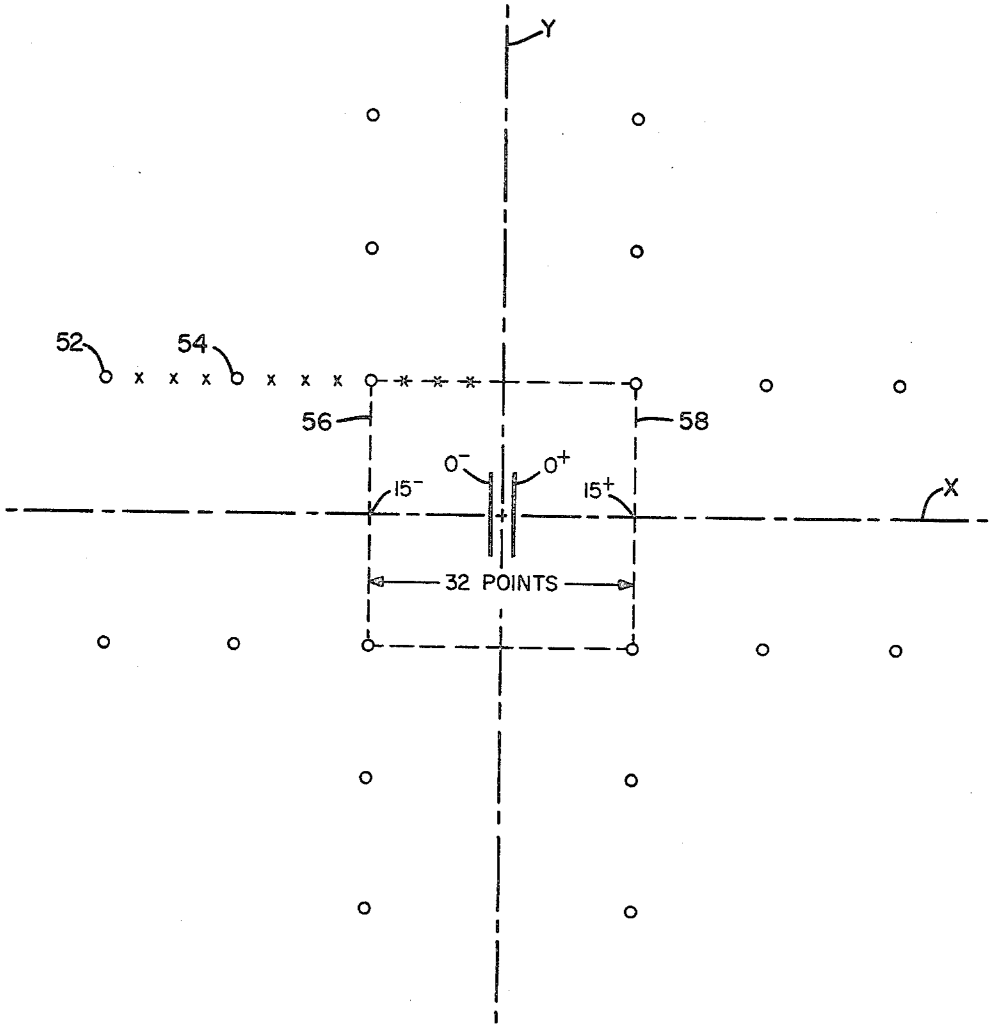
FIG. 2 illustrates the major positions obtained by the first deflection circuit and the minor positions at which the beam can be positioned by the second deflection circuit.

The location of the beam at this point can best be understood by referring to FIG. 2 which illustrates the major positions of the beam that can be obtained by the first deflection circuit and the minor positions at which the beam can be positioned by the second deflection circuit. It is to be understood that FIG. 2 illustrates only a portion of the display and, in particular, that portion located at the center of the screen where the X and Y center axes intersect. Circles 52 represent the major positions (64 by 64) at which the beam may be located by the first or major deflection circuit 4 shown in FIG. 1 while the small *x*'s 54 represent the minor positions (16 between major positions) at which the beam can be positioned by the second or minor deflection circuit 6 shown in FIG. 1.

As stated above, with current flowing only through metering resistors R1, R2, R4, R8 and R16 in minor deflection circuit 6, the beam is positioned at the left edge 56 of "window" 58. It will be noted that there are 16 positions ($0^-$–$15^-$) on the left side of the Y-axis and 16 positions ($0^+$–$15^+$) on the right side of the Y-axis. With the conditions stated above, the beam is now positioned at the location designated $15^-$. When all of the flip-flops 10 that are coupled to the minor deflection circuit 6 are SET, i.e. have a "1" applied to input line 14 to each flip-flop 10, the current through resistors R1, R2, R4 and R8 has been removed and is coupled through resistors R'1, R'2, R'4 and R'8 to driver transistor 42. However, CONTROL stage 18 is still providing current through resistor R16 to driver transistor 40. With 16 units of current flowing through yoke coil 22 and 15 units of current flowing through yoke coil 22', the beam is positioned at the location designated $0^-$ in FIG. 2.

At this time, all flip-flops 10 in input register 2 are SET, i.e. have a "1" on input line 14, except CONTROL stage 18 which is producing an output on line C. The next sequential signal in the beam positioning circuits, not shown, causes all stages of the input register 2 to change states. Thus, all flip-flops 10 coupled to both the major and minor deflections circuits 4 and 6 respectively are CLEARED, i.e. have a "0" applied on input line 14. When CONTROL stage 18 changes states, it removes the signal on line C from the base of gating transistor 20 thus disabling it and applies a signal on line S to the base of gating transistor 24 thus enabling it. It also removes the current from resistor R16 in minor deflection circuit 6 and applies it to resistor R'16 in circuit 6. Further, it removes the enabling signal from AND gates 38 and applies it to AND gates 36.

Under these conditions, no current flows through the metering resistors in the major deflection circuit 4 while in the minor deflection circuit 6 current flows through metering resistors R1, R2, R4, and R8 to driver transistor 40 as well as through metering resistor R'16 to driver transistor 42. This means that 16 units of current are flowing through yoke coil 22' and 15 units of current are flowing through yoke coil 22. Thus, the beam is now positioned at the location designated $0^+$ in FIG. 2. It can be seen, then, that as the stages of the input register 2 change states in binary fashion, the beam continues to move across the screen to the right edge of the screen.

Thus, metering resistors R16 and R'16 in the minor deflection circuit 6 are required because the minor deflection circuit 6 is connected for push-pull operation. Without these resistors, the minor deflection circuit 6 would cause the beam to move from the $15^-$ location shown in FIG. 2 to the $15^+$ location without difficulty but the problem would occur when the next bit applied to the input register 2 caused current to flow through metering resistor R16 of the major deflection circuit. This would cause 16 units of current to flow through gating transistor 24 to yoke coil 22'. However, at the same time the minor deflection circuit 6 would cause current to be removed from metering resistors R'1, R'2, R'4 and R'8 and be coupled to metering resistors R1, R2, R4, and R8. The 15 units of current flowing through these resistors would be coupled to yoke coil 22. With 16 units of current through yoke coil 22' and 15 units of current flowing through yoke coil 22, the beam would move to the location designated $0^+$ in FIG. 2 from location $15^+$ instead of to location $16^+$. This situation is corrected with the use of metering resistors R16 and R'16 in the minor deflection circuit 6 which are controlled by CONTROL stage 18. The beam then moves in increments smoothly from the left edge of the screen to the right edge of the screen.

The advantage of the novel circuit should not be lost from sight through the above discussion. That advantage is to be able to move the beam smoothly through the center of the screen in order to draw a continuous vector. This is accomplished in the present invention by enabling the minor deflection circuit 6 to position the beam not only between major position points but also between positions $15^-$ to $15^+$ as shown in FIG. 2. It is to be remembered that enabling voltages are continually applied to the bases of transistors 40 and 42 via lines 44 and 46 respectively. This means that these transistors are not required to switch at any time. Even though no current may be flowing through one of these transistors, both are still turned on and thus "switching" of the transistors is not required. However, "switching" of the transistors 20 and 24 in the major deflection circuit 4 is required and, thus, they are called "gating" transistors. This is done, however, while the minor deflection circuit 6 is moving the beam through the screen center region. Thus, when the beam is located at the position designated $0^-$ in FIG. 2, the next bit applied to the input register will switch CONTROL stage 18 which will remove the enabling signal from the base of gating transistor 20 and apply it to the base of gating transistor 24.

This means that these two transistors actually are switched. However, it is obvious that at this time the minor deflection circuit is still moving the beam through the center region. As a result of this operation, while the beam is moving through the center region, sufficient time is available to switch in gating transistor 20 or 24 to continue the beam traverse for vector display purposes.

Figure 3:
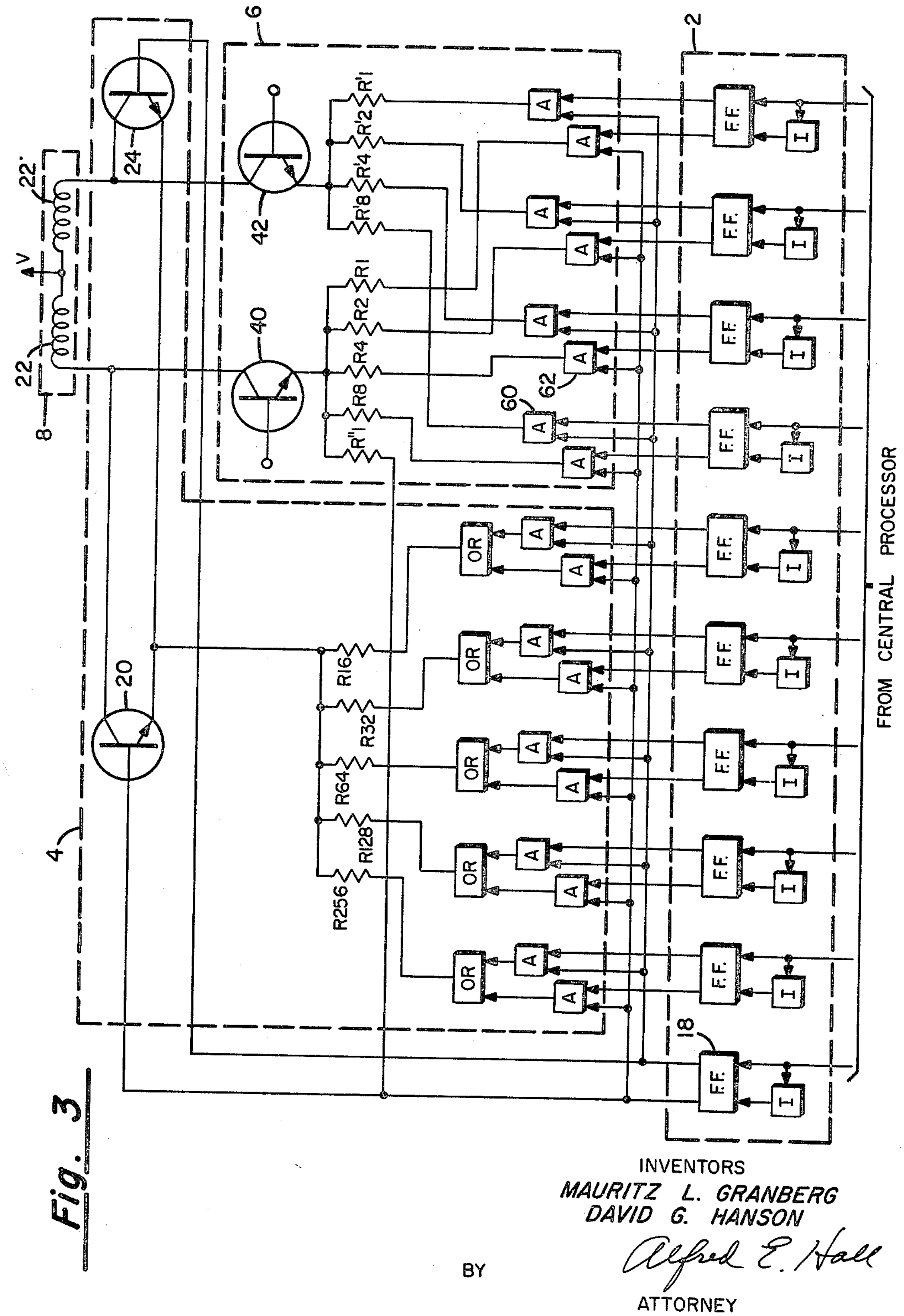
FIG. 3 is a circuit diagram of a second embodiment of the present invention wherein the second deflection circuit is of the single-ended type.

FIG. 3 discloses a second embodiment of the present invention in which like numerals indicate like elements in FIG. 1 and in which the minor deflection circuit 6 operates in single-ended fashion. There are only two differences between this embodiment and the embodiment shown in FIG. 1. First, AND gates 60 and 62 have been added on the inputs to the minor deflection circuit 6 in order to enable CONTROL stage 18 to switch the input digits from one D/A converter to the other after the beam has passed the center region of the screen. Secondly, to get an even number of beam positions with the single-ended arrangement, i.e. 512 by 512 or 1024 by 1024, it is necessary to add an extra "1" count in either deflection coil 22 or 22'. This is accomplished as shown in FIG. 3 by adding an extra metering resistor R''1 in the emitter circuit of driver transistor 40. However, it could have been added to the emitter circuit of driver transistor 42.

Thus, in this embodiment as in the embodiment of FIG. 1, it can be seen that driver transistors 40 and 42 in minor deflection circuit 6 are never turned "off" but are always "on" by virtue of the voltage continually applied to their respective bases. Therefore, it can be seen that only the gating transistors 20 and 24 in the major deflection circuit have to be actually "switched" and this takes place in the interval of time that the minor deflection circuit 6 is moving the beam through the center region of the screen.

It is understood that suitable modifications may be made in the structure as disclosed provided such modifications come within the spirit and scope of the appended claims. Having now, therefore, fully illustrated and described our invention, what we claim to be new and desire to protect by Letters Patent is set forth in the appended claims.

1. Electron beam deflection circuitry for a cathode ray tube display system comprising:

(a) first and second beam deflection coils for deflecting the electron beam for the cathode ray tube along one axis, (b) a first deflection circuit electrically coupled to said first and second beam deflection coils for positioning said beam in major locations along said one axis on said display, and (c) a second deflection circuit electrically coupled to said first and second beam deflection coils for positioning said beam in minor locations between said major locations along said one axis on said display.

2. Circuitry as in claim 1 wherein said first deflection circuit comprises:

(a) a digital-to-analog converter for converting digital representations of said major locations to corresponding increments of current, and (b) gating transistors coupled to said digital-to-analog converter and said first and second beam deflection coils for alternatively coupling said increments of current to said first and second coils in a single-ended configuration.

3. A circuit as in claim 2 wherein said digital-to-analog converter comprises:

(a) a plurality of metering resistors having resistance values forming a geometric progression that produce increments of current that position said beam in said major locations on said display.

4. Circuitry as in claim 3 wherein said second deflection circuit comprises:

(a) first and second digital-to-analog converters for converting digtal representations of said minor locations to corresponding increments of current, (b) first and second driver transistors continually coupling the output of said first and second digital-to-analog converters to corresponding ones of said coils, and (c) means for coupling said digital representations to said first and second digital-to-analog converters simultaneously to produce push-pull operation of said second deflection circuit.

5. A circuit as in claim 4 wherein said first and second digital-to-analog converters comprise:

(a) a first and second plurality of metering resistors, each plurality having like resistance values forming a geometric progression that produce increments of current that position said beam in said minor locations between said major locations on said display.

6. A circuit as in claim 1 wherein said second deflection circuit comprises:

(a) first and second digital-to-analog converters, (b) first and second driver transistors coupling the output of said digital-to-analog converters to corresponding ones of said coils, and (c) means for alternatively coupling digital input signals to said digital-to-analog converters to produce single-ended operation of said second deflection circuit.

7. A circuit as in claim 6 wherein said first and second digital-to-analog converters comprise:

(a) a first and second plurality of metering resistors, each plurality having like resistance values forming a geometric progression to produce increments of current that position said beam in said minor locations between said major locations on said display.

8. Electron beam deflection circuitry for a cathode ray tube display system comprising:

(a) first and second beam deflection coils, (b) a first deflection circuit for positioning said beam in major locations on said display, said circuit comprising:

(1) a digital-to-analog converter for converting digital representations of said major locations to corresponding increments of current, and (2) gating transistors coupled to said digital-to-analog converter and said first and second beam deflection coils for alternatively coupling said increments of current to said first and second coils in a single-ended configuration, and (c) a second deflection circuit for positioning said beam in minor locations between said major locations on said display, said second deflection circuit comprising:

(1) first and second digital-to-analog converters, (2) first and second driver transistors continually coupling the output of said first and second digital-to-analog converters to corresponding ones of said coils, and (3) means for coupling digital input signals to said digital-to-analog converters simultaneously to produce push-pull operation of said second deflection circuit.

9. Circuitry as in claim 8 further including:

(a) an input register, said register comprising:

(1) a first group of stages each producing first and second digital outputs, said first outputs being coupled to said first digital-to-analog converter in said second deflection circuit and said second outputs being coupled to said second digital-to-analog converter in said second deflection circuit, (2) a second group of stages each producing first and second digital outputs, and (3) a control stage producing first and second digital outputs, said first output of said control stage alternatively coupling said first and second outputs of said second group of stages to said digital-to-analog converter in said first deflection circuit.

10. Circuitry as in claim 9 further including:
(a) means coupling said first and second outputs of said control stage to corresponding ones of said first and second gating transistors for alternatively energizing said first and second gating transistors thereby alternatively coupling said increments of current to said first and second coils in a single-ended configuration.

References Cited

UNITED STATES PATENTS

| | | | |
|---|---|---|---|
| 3,309,560 | 3/1967 | Popodi | 315—27 |
| 3,417,284 | 12/1968 | Granberg et al. | 315—27 |

RODNEY D. BENNETT, Jr., Primary Examiner
JOSEPH G. BAXTER, Assistant Examiner